United States Patent Office 3,169,864
Patented Feb. 16, 1965

3,169,864
PHOTOSENSITIVE MATERIALS COMPRISING DIAZONIUM SALTS OF BISPHENOL ESTERS
Reynold E. Holmen, White Bear Lake, Minn., assignor to Minnesota Mining and Manufacturing Company, St. Paul, Minn., a corporation of Delaware
No Drawing. Filed May 15, 1962, Ser. No. 194,961
7 Claims. (Cl. 96—75)

This application is a continuation-in-part of my copending application Serial No. 502,742, filed April 20, 1955.

This invention relates to novel diazo compounds and in particular to light-sensitive diazonium derivatives of diphenolic acid esters of polyhydric alcohols. Another class of diphenolic acid derivative compounds is described and claimed in my application Serial No. 71,444, filed November 25, 1960, as a division of said application Serial No. 502,742, patented on May 16, 1961, as Patent No. 2,984,685, and entitled "Diphenolic Acid Hydrazide."

The diphenolic acids and esters here under consideration may be identified as a class of bisphenol compounds having a radical containing a carbonyl group and in which the carbonyl carbon atom and the connecting carbon atom of the bisphenol group are joined by an alkylene radical of at least two carbon atoms, i.e. a polymethylene or alkyl-substituted polymethylene radical. A specific example is gamma,gamma-bis(4-hydroxyphenyl) valeric acid. These acids and esters are readily produced by reaction, in the presence of a mineral acid catalyst, between (1) a phenol and (2) an oxocarboxylic or keto acid or ester in which a keto group is connected to a carboxy or carboalkoxy radical through an alkylene radical of at least two carbon atoms. A typical preparation involves the reaction at room tempreature between phenol and levulinic acid in the presence of calcium chloride, concentrated hydrochloric acid, and mercaptoacetic acid to produce γ,γ-bis(4-hydroxy-phenol) valeric acid having the formula

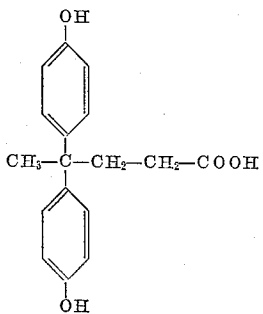

The acids are highly reactive and easily esterified. Simple esters are easily re-esterified by ester interchange. The esters may also be prepared directly by reaction between the phenol and the keto ester, as in the preparation of the ethyl ester of γ,γ-bis(4-hydroxyphenyl) valeric acid from phenol and ethyl levulinate by reaction at room temperature in the presence of mercaptoacetic acid and HCl in absolute alcohol. Sulfuric acid is a useful but less desirable catalyst. The reaction may be completed in shorter times at somewhat elevated temperature, for example under reflux. Analogous reactions of phenol or lower alkyl substituted phenols with levulinic acid or smaller polymethylene keto acids, e.g. licanic, geronic, mesitonic, d-oxocaproic, and homolevulinic acids, lead to other diphenolic acids and esters useful in the practice of the present invention. Typical of such compounds are γ,γ-bis(4-hydroxy-3-methylphenyl) valeric acid and its methyl, ethyl and propyl esters, the acid having the formula

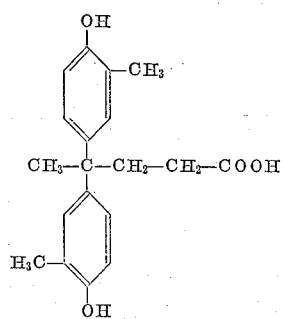

Phenols with other lower alkyl side chains such as ethyl or propyl radicals are also useful, the general formula being

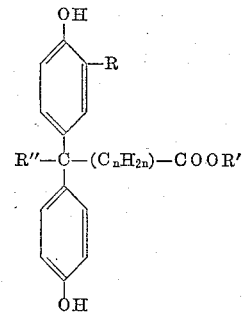

wherein R and R' are hydrogen or lower alkyl, R" is methyl or ethyl, and $n$ is 2, 3 or 4.

It has now been found that compounds of the general formula just indicated may be converted to photosensitive diazonium derivatives useful in the graphic arts. In particular those hydroxy esters of the diphenolic acids and polyhydroxy alcohols such as glycerol, pentaerythritol, sorbitol and trimethylolpropane, such as may be obtained either by direct esterification or by ester interchange, are found to be useful as photosensitive coatings for lithographic plates. The diazonium structure provides sensitivity to light, so that the plate may be exposed to a lighti-image and then developed to a corresponding differentially ink-receptive and water-receptive lithographic printing surface. The hydroxy-terminated ester provides increased differential properties, and makes possible the formation of lithographic plates capable of good reproduction on the lithographic press.

Conversion of the diphenolic acids and esters to the photosensitive diazonium derivative is conveniently accomplished in a series of steps involving nitrosation with nitrous acid, e.g. from sodium or n-butyl nitrite in acid solution; reduction to the amine, e.g. with zinc dust and concentrated hydrochloric acid; and diazotization at low temperatures with sodium nitrite in acid solution.

These diazonium derivatives react with azo coupler components to form color-bodies, and may therefore be used in the dyeing of fabrics. The fabric is first treated with the diazonium derivative and is then exposed to a light-image to destroy the diazo linkage at the light-struck areas. Reaction with an azo coupler at the unexposed areas then produces the desired color pattern. Where necessary, the fabric may be preliminarily treated with aluminum hydrate or other mordant. With the diphenolic acids, mordanting may be accomplished by precipitation as the salt of a heavy metal, e.g. chromium.

As noted hereinbefore, the hydroxy esters of the diphenolic acids with polyhydroxy alcohols provide an easily obtainable class of materials from which to produce a preferred form of the photosensitive diazonium materials of the invention. A preferred procedure involves the partial esterification of the alcohol by reaction with the acid in organic solvent solution at elevated temperature, e.g. under reflux with continual separation of the water of condensation, and in the presence of an acid catalyst.

*Example 1*

A mixture of 5 grams (0.175 mol) of γ,γ-bis(4-hydroxyphenyl) valeric acid and 0.55 gram (.0059 mol) of glycerol in 25 ml. of dioxane, to which was added two drops of conc. sulfuric acid, was heated under reflux for 24 hours. The dioxane was then removed by evaporating nearly to dryness, and the residue dissolved in ethyl acetate, washed with 10% sodium bicarbonate solution, centrifuged to remove water, and dried over MgSO₄. The dried solution was filtered and the solvent evaporated at reduced pressure. Analysis of the residue showed it to be the monoester having the formula

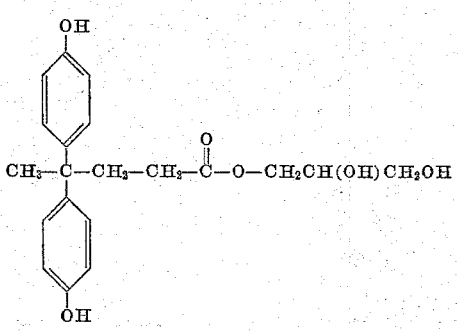

A 1.0-gram portion of the monoester was dissolved in 10 ml. of dioxane, and to the solution was added a solution of 0.7 gram of sodium nitrite in 2 ml. of water, and 2 ml. of conc. hydrochloric acid. The cold solution was allowed to stand for several hours. There was then added 5 ml. of the acid and 2 gm. of powdered zinc, the latter being added in small portions. The mixture was allowed to stand for completion of the reaction. The mixture was cooled, and 0.7 gm. of sodium nitrite was added. Addition to a test sample of a small portion of a solution of beta-naphthol produced a brilliant red color, confirming the presence of a diazonium compound.

A portion of the solution, containing approximately 5 percent by weight of the diazonium compound, was sparingly coated over an aluminum panel which was first cleaned by etching with a solution of potassium hydroxide and carefully rinsed and dried. The dry coating was then exposed for ten minutes to a light-image under standard conditions as employed in the exposure of lithographic printing plates. A faint visible image was produced. The plate was treated with process gum and then inked, producing a negative plate from which printed copies could be obtained.

*Example 2*

A mixture of 5 gm. of the ethyl ester of γ,γ-bis(4-hydroxyphenyl) valeric acid, 3 gm. of glycerol and 0.1 gm. of calcium acetate was heated in an open tube for eight hours. During this period the temperature was gradually increased from about 170° C. to about 190° C. and ethanol was evolved. The mixture was further heated under vacuum at about 180–190° C. for several hours. The cooled residue was a clear, light amber, hard and slightly brittle resinous material. Analysis showed it to be a mixture of monoester and diester.

A 1.0 gram sample of the resinous material was dissolved in 10 ml. of dioxane, nitrosated by the addition of 0.7 gm. of sodium nitrite in 2 ml. of water followed by 2 ml. of conc. hydrochloric acid, reduced to the amine by addition of 2.0 gm. of zinc dust and 5 ml. of conc. hydrochloric acid, filtered, with addition of a further 5 ml. of dioxane, and diazotized by addition in the cold of 0.7 gm. of sodium nitrite. The resulting brown solution had a concentration of 4%. A dried thin coating of this material on a smooth clean substrate produced a visible positive image when exposed through a negative transparency for ten minutes to intense illumination. Treatment of the coated surface with a coupler solution containing beta-naphthol as an azo coupler component converted the unexposed image areas to a reddish purple.

*Example 3*

To 20 ml. of dioxane was added 5 gm. of γ,γ-bis(4-hydroxyphenyl) valeric acid, 0.8 gm. of pentaerythritol, and two drops of concentrated sulfuric acid. The mixture was heated on the steam bath for several hours, distilled slowly until pure dioxane was evolved, and the remainder then poured slowly into a 10% solution of sodium bicarbonate. A viscous liquid separated. It was washed with further bicarbonate solution and then with water until neutral. It was further purified by separation and filtering in solution in ethyl acetate, and dried under vacuum. Analysis showed 66.7% carbon, 6.8% hydrogen, corresponding to a mixture of mono- and di-esters. The remaining product was dissolved in dioxane, nitrosated with nitrous acid, reduced with zinc and HCl, and diazotized. The product in the form of a dilute solution in dioxane was reddish brown. It gave a positive coupling test with beta-naphthol.

*Example 4*

Gamma,gamma-bis(4-hydroxyphenyl) valeric acid was esterified with glycerol to give a product corresponding to a mixture of the mono- and di-esters. This was nitrosated, reduced to amine, and then diazotized. The diazonium salt was light sensitive and gave a developable image when coated on a properly cleaned aluminum sheet and exposed through a transparency to an arc-lamp light source. Image development with a colored two-phase developer composition as described in Hall U.S. Patent No. 2,754,279 was particularly effective.

The diazo compounds of the present invention may alternatively but less desirably be prepared by direct nitration of the diphenolic acid, ester or hydroxyester under mild nitrating conditions as conventionally employed in the nitration of phenols, followed by reduction and diazotization. Since greater amounts of reducing agents are required for the reduction of nitro compounds than of nitroso compounds, processes involving the latter route and as described in the foregoing illustrative examples are greatly preferred.

I claim:
1. A diazonium salt of a bisphenol compound, said compound having a hydrogen atom ortho to the phenolic hydroxyl, said compound having a radical containing a carbonyl group and in which the carbonyl carbon atom and the connecting carbon atom of the bisphenol group are joined by an alkylene radical having a chain length of at least two carbon atoms, said diazonium salt being further characterized as being capable of reacting with a beta-naphthol coupler solution in a coupling reaction with formation of a color-body.

2. A diazonium salt of a bisphenol compound, said compound having the formula

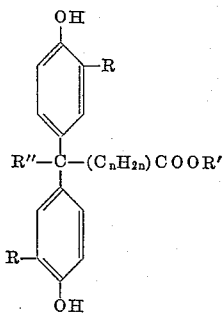

wherein R and R' are selected from the class consisting of hydrogen and lower alkyl, R" is selected from the class consisting of methyl and ethyl, and $n$ is 2 to 4, and said diazonium salt being further characterized as being capable of reacting with a beta-naphthol coupler solution in a coupling reaction with formation of a color-body.

3. A diazonium salt of a bisphenol compound, said compound having the formula

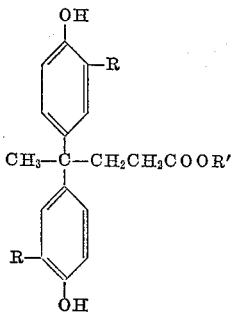

wherein R and R' are selected from the class consisting of hydrogen and lower alkyl, and said diazonium salt being further characterized as being capable of reacting with a beta-naphthol coupler solution in a coupling reaction with formation of a color-body.

4. A diazonium salt of a bisphenol compound, said compound being a hydroxyester of a polyhydric alcohol and a bisphenol acid having the formula

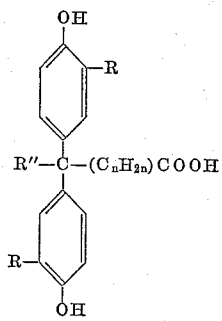

wherein R is selected from the class consisting of hydrogen and lower alkyl, R" is selected from the class consisting of methyl and ethyl, and $n$ is 2 to 4, and said diazonium salt being further characterized as being capable of reacting with a beta-naphthol coupler solution in a coupling reaction with formation of a color-body.

5. A diazonium salt of a bisphenol compound, said compound being a hydroxyester of a polyhydric alcohol and a bisphenol acid having the formula

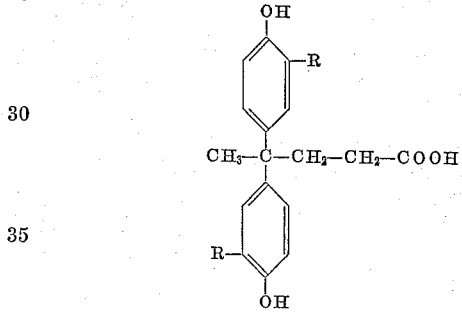

wherein R is selected from the class consisting of hydrogen and lower alkyl, and said diazonium salt being further characterized as being capable of reacting with a beta-naphthol coupler solution in a coupling reaction with formation of a color-body.

6. A photosensitive lithographic printing plate having a water-resistant backing and a hydrophilic light-sensitive coating including as an essential component a light-sensitive diazonium salt of a bisphenol compound as defined in claim 1.

7. The photosensitive lithographic printing plate of claim 6 in which the light-sensitive component is a diazonium salt of a bisphenol compound as defined in claim 5.

References Cited in the file of this patent
UNITED STATES PATENTS
2,702,243    Schmidt _____ Feb. 16, 1955
FOREIGN PATENTS
1,106,171    Germany _____ May 4, 1961
OTHER REFERENCES
Saunders: The Aromatic Diazo Compounds, Edward Arnold & Co., London, 1949, pages 16 and 28–35.
Tedder et al.: Journal of the Chemical Society, July 1958, pages 2573–2579.